April 13, 1943.  E. ORSHANSKY, JR  2,316,278
DRIVE
Filed Oct. 14, 1939   2 Sheets-Sheet 1
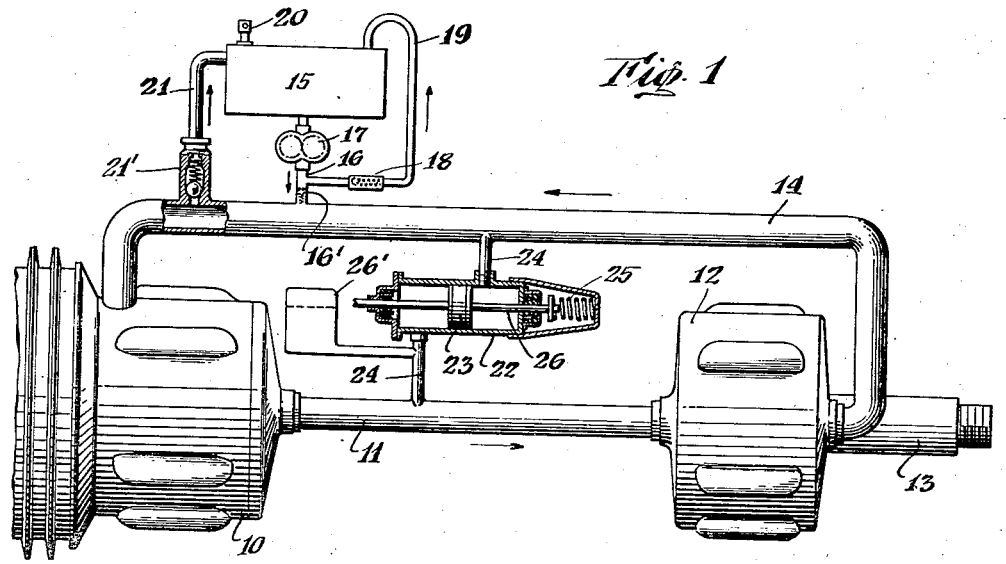
Fig. 1
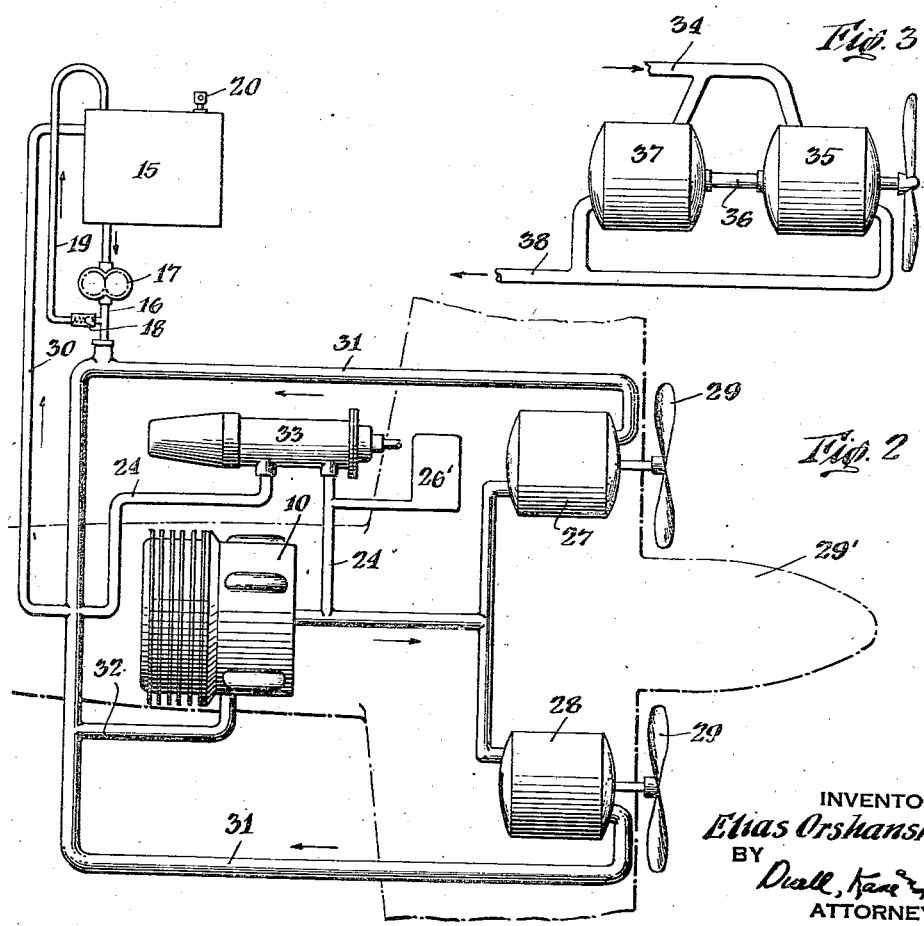
Fig. 3
Fig. 2
INVENTOR
Elias Orshansky, Jr.
BY
ATTORNEYS

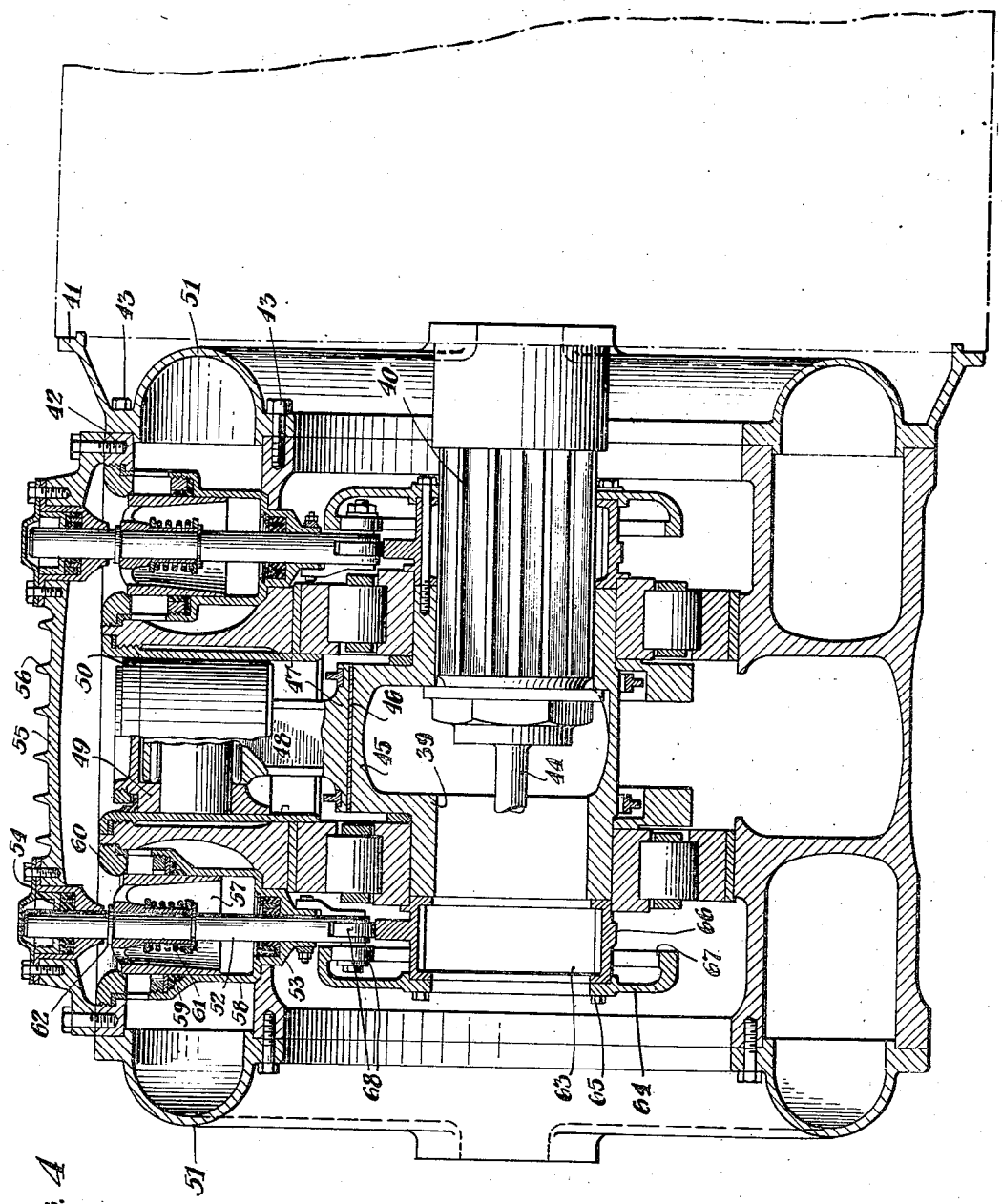

Patented Apr. 13, 1943

2,316,278

UNITED STATES PATENT OFFICE 2,316,278

DRIVE

Elias Orshansky, Jr., University Heights, Ohio, assignor to The Acrotorque Company, Cleveland, Ohio, a corporation of Connecticut Application October 14, 1939, Serial No. 299,403

4 Claims. (Cl. 60—53)

This invention relates to a structurally and functionally improved drive, capable of use in numerous different associations, but primarily intended for employment in installations where power is to be employed at points relatively remote from the source of such power. Such a form of drive would be especially desirable in aircraft.

In connection with aircraft drives, it is a well appreciated fact that considerable difficulty has been experienced incident to the fact that it has been customary, and in fact essential, under present day practice, to mount motors immediately adjacent the propellers and to employ one motor for each propeller and despite the fact that it would have been desirable to have positioned the motor or motors at points relatively remote from the propeller or propellers. In this connection, it is well understood that with present power requirements, it does not appear feasible to employ shafting, tubing, chains or other conventional forms of drives in order to couple a motor to a propeller while at the same time having these units disposed at relatively remote points in an airplane.

Thus, it is an object of the invention to provide a drive which will permit of a motor being located at one point, while a power consuming element (such as a propeller) may be coupled to be driven by the motor and located at another point. Moreover, by means of the present drive, the power will be transmitted with minimum losses.

Consequently, it will be feasible to, for example, position the motor in the fuselage of a plane and even adjacent the empennage section thereof, while at the same time, the propeller may be conventionally located at the nose of the fuselage, adjacent the leading edges of the wing, or in any other desired position.

Additionally, a single prime mover may be caused to drive a plurality of propellers, or conversely a multiplicity of prime movers—which may be positioned at a point remote from the propeller—may be caused to drive a single propeller.

As a consequence, propellers may be positioned as desired adjacent the leading or trailing edges of the supporting surfaces, or at various other points, with respect to such surfaces or the fuselage, without it being necessary to strengthen or brace such points of location in a manner heretofore necessary where a relatively heavy internal combustion motor was positioned immediately adjacent the propeller which it drove.

A further object is that of providing a drive or system of power transmission which will be extremely flexible and permit great latitude of design when applied to aircraft, but which system may additionally be employed in numerous other associations where it is desired to achieve the functional results capable of accomplishment by means of the present invention.

Another object is that of providing power transmitting and converting units of novel and improved constructions and by means of which the foregoing results may be achieved.

Still another object is that of designing a system and units embodying relatively few parts, each individually simple and rugged in construction and capable of assemblage to furnish a unitary structure operating over long periods of time with freedom from all difficulties.

With these and other objects in mind, reference is had to the attached sheets of drawings illustrating practical embodiments of the invention, and in which:

Fig. 1 is a diagrammatic view of one form of drive constructed in accordance with the present teachings;

Fig. 2 is a similar view but showing a different form of drive, mounted in an aircraft unit;

Fig. 3 shows a still further layout of apparatus and

Fig. 4 is a sectional side view taken through one of the pump-motor units and with certain of the mechanism removed to clarify the adjacent construction.

Referring primarily to Figs. 1 and 2, the numeral 10, in each instance, indicates a unit within which there is combined a pump and engine or prime mover. The prime mover may be of any desired type, but as presently viewed, should be an internal combustion engine embodying any convenient design and structure. This element may be regarded as the primary source of power and it is preferably directly coupled to the pump situated adjacent the same, and one form of which will be hereinafter described in connection with Fig. 4.

As viewed in Fig. 1, the pump is connected by a tube or conduit 11, with a motor unit 12. The structure of the latter should conveniently correspond to the structure embodied in the pump but in any event it will be appreciated that the tube or conduit should be of the type capable of retaining fluid under a high pressure, and without danger of a leakage or rupture. Extending from unit 12 is a shaft 13 which mounts the propeller (not shown). A return or low pressure line or conduit 14 extends from the motor back to the pump, and may have coupled to it a liquid supply tank 15 by means of a tube 16. A pump 17, driven in any suitable manner, serves constantly to maintain a head of pressure within conduit 14 and, in the event that the pressure within the latter exceeds a predetermined value, a relief valve 18 will function to permit liquid to be diverted by the pump through a by-pass 19 and directly returned to tank 15.

This unit should be sealed and a fitting 20 may be associated with the same, so that air under pressure may be introduced into the tank above the body of the liquid within the same. In this manner, the system is "primed" and in fact, if the air pressure is maintained it may be feasible to dispense with the pump 17. In other words, air under sufficient pressure will constantly assure that all passages of the system are completely filled with liquid.

It will be understood that a certain amount of air might be trapped within the system and this air should be evacuated. Thus, the return or low pressure line 14 may have a branch 21 connected to it, and the upper end of this branch may be connected to the upper end of tank 15 and within which a layer of air is normally present. Consequently, entrained bubbles of air will be diverted to this point.

Where it has heretofore been attempted to devise a system of this nature, considerable difficulties have been experienced incident to surges, especially in the high pressure side of the system. This has not been overcome by simply furnishing a pressure bulb or chamber connected to the high pressure side of the system. However, in the present invention, I prefer to couple the high and low pressure conduits 11 and 14 by means of a unit embracing a casing 22 which is in effect a cylinder containing a piston 23 and having ports to each side of the piston and connected by branches 24 to the high and low pressure lines. A spring or other suitable resistance 25 may act through the piston rod 26 or otherwise to normally urge the piston in a given direction, and against the head established by the high pressure line extending from unit 10. Consequently, in the event of surges occurring, the piston will move, although it will constantly tend to return to its initial position. As also shown, there may be connected to one branch 24, an air chamber or dome 26'. Additionally, check valves 16' and 21' may be associated with branches 16 and 21 respectively, so that in the event of the fluid motor driving the pump, dangerous pressure conditions will not occur within tank 15. Such a driving of the parts might, of course, follow in the case of aircraft installation where the unit was being dived so that the propeller would in effect be rotating the motor.

Now, having in mind that the pump, forming a part of unit 10 and the motor providing unit 12, are preferably of substantially identical construction, it will be understood that they will either rotate in synchronism, or else under a predetermined timed relationship. This relationship will result in a harmonising of the surges between the high and low pressure lines. More especially, unit 22—as afore stated—is connected to both lines. The piston assembly may conveniently present faces of equivalent area. Consequently, as surges occur, the piston will move and the increases and decreases of volume in the lines will be compensated for. This results in elimination of hammering effects and uneven power output. This is of primary importance in most drive installations and is especially desirable where aircraft propellers are being operated.

In the form of drive shown in Fig. 1, a single engine-pump assembly is employed to drive a single motor. It is apparent that a single relatively large unit 10 might be employed to drive a multiplicity of motors, as shown in Fig. 2, in which duplicate motors have been indicated by the reference numerals 27 and 28 and have coupled to them propellers 29; the entire assembly being mounted in an aircraft unit, shown in a fragmentary manner and indicated by the numeral 29'. Also, in this instance, a supply tank is preferably employed and an air-venting pipe 30 may likewise be utilized. The return lines 31 from the motors connect to the common intake 32 of unit 10. Additionally, the surge unit, indicated at 33, may have its branches coupled respectively to the return lines and the high pressure supply line.

In certain instances, it may be desired to employ a single engine-pump unit to drive a multiplicity of motors, which are interconnected so as to have a single power output. Such an arrangement has been shown in Fig. 3, in which the high pressure supply line 34 has been shown as connected to motors 35 and 37. A return, or low pressure line 38, is coupled to each of these motors, and a connecting shaft 36 extends between the motor units so that, for example, a single propeller may be driven by both of the latter.

Now considering the preferred construction of the motor and pump units, attention is directed to Fig. 4 in which the numeral 39 indicates a driving or driven shaft in the form of a hub or tube which is provided with a portion which receives a splined shaft 40. These elements are coupled against movement. As indicated in Fig. 4, the casing 41 of an internal combustion motor or driving engine is coupled against movement with respect to case 42 of the unit by, for example, bolts 43. Under these circumstances, shaft 40 will, of course, be the driving shaft and the unit shown in Fig. 4 will function as a pump. Obviously, however, if the latter is functioning as a motor, the shaft 40 will be a part of the propeller or other driven assembly. Thus, in the following description, which follows the illustration, the specification—so far as it is limited to a pump— is to be taken in an illustrating rather than in a limiting sense.

Under these circumstances, there may be coupled to shaft 40, an extension such as 44 and by means of which gear pump 17 may be driven, if such an element is utilized. The shaft or sleeve 39 is formed with an eccentric or crank portion 45. As illustrated, this portion may be engaged by layers of bearing material 46 associated with the inner ends 47 of cranks 48. The outer ends of these cranks are connected one to each of pistons 49 reciprocable within cylinders, provided by tubes 50, which are preferably removable, although normally fixed with respect to the main casting or body of the unit.

At this time, it will be observed that as is indicated in Fig. 1, each one of these units may conveniently include seven cylinders and thus, for each rotation of crank 45, each piston will perform a complete cycle. Coupled to the casting or frame of the unit are casing sections 51 which provide high and low pressure manifolds. Between these and the cylinders, valve assemblies are provided so as to govern the flow of liquid.

These assemblies may each include a rod 52 having its axis lying parallel to the adjacent cylinder axis and extending in slidable relationship through packing 53 positioned adjacent the inner end of the rod, as well as packing 54 disposed adjacent the outer end of the same. The latter packing assemblies may be mounted by head portions 55 conveniently formed with heat dissipating flanges 56. These head portions are provided one for each of the cylinders and furnish passages extending towards the manifolds and valve assemblies.

A valve body in the form of a skirt 57 may be slidably mounted within a cup member 58 provided for each valve and a packing 59 is associated with this member and bears against the valve body 57 to prevent leakage at this point. A valve seat is provided by a ring 60 removably mounted between the frame of the unit, and this seat, in conjunction with the skirt or body 58, provides a ground line seal. In order to prevent injury of the parts, a spring 61 encircles rod 52 and acts against valve body 57. Movement of the latter along the rod, beyond a predetermined point, is prevented by a stop member 62. As a result of this construction, it will be apparent that as rod 52 is moved outwardly, and the valve body contacts its seat, such contact, while adequate to furnish a perfect seal, will not result in damage to the parts.

In order to assure the desired movements of the rod, there may be secured to shaft 39 an extension 63 and a further extension 64. Such coupling may be effected by means of bolts 65. Thus, these extensions move in synchronism with the shaft and the face of one provides a cam member 66 which will thrust the rods 52 outwardly, while the second of the same furnishes a cam ring 67 which will pull the rods inwardly. A pair of rollers 68 are mounted adjacent the inner end of each of the rods and cooperate with the respective cams in order to secure properly timed movements of the valves with respect to the piston movements.

Consequently, these rollers or any equivalent portions are not subjected to reverse rotation and aggravated wear. As shown in Fig. 4, the piston is at dead center and thus both valves are closed. However, with any further movement one of these valves will open to permit the piston to suck fluid into the cylinder. A pair of valves are preferably furnished for each cylinder and the low pressure manifold is connected to the return or low pressure line, while the high pressure manifold is connected to the high pressure line or supply pipe. These connections have not been shown, in that the manifolds may be coupled to the same in any desired and obvious manner.

It will be observed, that a unit embodying a construction such as the foregoing will assure the elimination of leakage losses past the valves and pistons. Moreover, this unit will not be dependent on the viscosity temperature or pressure of the oil or other fluid which is employed in the system. Additionally, it is to be noted that the valve structures are, in each instance, balanced.

In pump and fluid motor constructions, as heretofore employed, the sealing of the fluid is effected by the fact that the fits between moving parts are held to such close tolerance that a minimum of fluid leakage results. However, such leakage as does occur increases as the square of the pressure and directly as the viscosity of the fluid drops and the temperature of the latter rises.

In the present unit, the valves, which are sealed on one side by a ground seat, and on the other by packing, prevent such a result. Additionally, the valves are balanced and consequently it is unnecessary to employ driving force to overcome heads of pressure and unseat these valves. Thus, it will be apparent, that a practical drive is furnished in which losses are held to a minimum.

Considering the use of units of this character, in connection with a drive system, as heretofore described, it will be understood that such surges as occur are due to unevenness of delivery of fluid from the cylinders of the pump. If, as shown, seven cylinders are employed, 14 peaks of delivery occur during any given revolution of the pump shaft. By employing a compensator structure, the piston 23 is caused to rapidly reciprocate. Of course, the frequency of the surges may be modified by the fact that the motor may operate at a different speed or out of phase with the pump, but this will ordinarily not be the case, because a harmonious relationship of the parts will be established in one or another sense.

As has been indicated, and in order to dampen the vibrations, or put them out of phase with the torsional vibrations of the prime mover, an air chamber 26' may, in certain instances, be employed, although in many other cases no such unit will be necessary.

Thus, it will be understood, that among others, the several objects of the invention, as specifically forenoted, are achieved. It is obvious that numerous changes in constructions and rearrangements of the system might be resorted to without departing from the spirit of the invention as defined in the claims.

Having described my invention, what I claim is:

1. A power drive, including in combination, a power driven pump, a fluid driven motor, means providing a passage extending from said pump to said motor, means providing a return passage from said motor to said pump, a single surge preventing means mounted across and connected to both of said passages and means forming a part of said last named means for increasing and decreasing the amount of liquid flowing from the pump to the motor in direct proportion to a decrease and increase in the amount of fluid flowing from the motor to the pump.

2. A drive, including in combination, a power driven pump unit, a fluid driven motor unit, said units having harmonious operating characteristics, whereby related fluid pulsations occur as the first unit drives the second unit, means providing a high pressure line extending from said pump to said motor and a low pressure line for the return of fluid from the motor to the pump whereby the latter may drive the former, means directly connecting said lines to each other and means interposed within said last named means for increasing the volume of one of said lines as the volume of the second of the same is decreased.

3. A drive, including in combination, a power driven pump unit, a fluid driven motor unit, said units having harmonious operating characteristics, whereby related fluid pulsations occur as the first unit drives the second unit, means providing a high pressure line extending from said pump to said motor and a low pressure line for the return of fluid from the motor to the pump whereby the latter may drive the former, means directly connecting said lines to each other, means interposed within said last named means for increasing the volume of one of said lines as the volume of the second of the same is decreased and said lines being otherwise unconnected whereby a flow of fluid from one line to the other is prevented except through said motor and pump.

4. A drive, including in combination, a power driven pump unit, a fluid driven motor unit, said units having harmonious operating characteristics, whereby related fluid pulsations occur as the first unit drives the second unit, means providing a high pressure line extending from said pump to said motor and a lower pressure line for the return of fluid from the motor to the pump whereby the latter may drive the former and a single means directly connected with and extending across said lines for increasing the volume of fluid in one of the same as the volume of fluid in the other is decreased.

ELIAS ORSHANSKY, Jr.